(12) United States Patent
Wang et al.

(10) Patent No.: US 10,186,299 B2
(45) Date of Patent: Jan. 22, 2019

(54) METHOD AND ELECTRONIC DEVICE FOR GENERATING MULTIPLE POINT OF VIEW VIDEO

(71) Applicant: HTC Corporation, Taoyuan County (TW)

(72) Inventors: Yuan-Kang Wang, Taoyuan County (TW); Wen-Chuan Lee, Taoyuan County (TW)

(73) Assignee: HTC Corporation, Taoyuan (TW)

(*) Notice: Subject to any disclaimer, the term of this patent is extended or adjusted under 35 U.S.C. 154(b) by 473 days.

(21) Appl. No.: 14/308,716

(22) Filed: Jun. 19, 2014

(65) Prior Publication Data

US 2015/0015680 A1    Jan. 15, 2015

Related U.S. Application Data

(60) Provisional application No. 61/844,439, filed on Jul. 10, 2013.

(51) Int. Cl.

| | |
|---|---|
| *G11B 27/034* | (2006.01) |
| *G11B 27/30* | (2006.01) |
| *G11B 27/28* | (2006.01) |
| *G11B 27/19* | (2006.01) |
| *G11B 27/10* | (2006.01) |
| *G06F 17/30* | (2006.01) |
| *H04N 9/806* | (2006.01) |
| *H04N 21/414* | (2011.01) |
| *H04N 21/472* | (2011.01) |

(52) U.S. Cl.
CPC ............ *G11B 27/034* (2013.01); *G11B 27/10* (2013.01); *G11B 27/19* (2013.01); *G11B 27/28* (2013.01); *G11B 27/30* (2013.01); *G06F 17/30056* (2013.01); *H04N 9/806* (2013.01); *H04N 21/41407* (2013.01); *H04N 21/47205* (2013.01)

(58) Field of Classification Search
CPC .................................................... G11B 27/034
See application file for complete search history.

(56) References Cited

U.S. PATENT DOCUMENTS

| | | | |
|---|---|---|---|
| 6,738,075 B1* | 5/2004 | Torres ................. | G11B 27/034 348/333.05 |
| 2008/0019661 A1* | 1/2008 | Obrador ............... | G11B 27/034 386/210 |

(Continued)

*Primary Examiner* — Christopher S Kelley
*Assistant Examiner* — Asmamaw G Tarko
(74) *Attorney, Agent, or Firm* — JCIPRNET

(57) ABSTRACT

The present disclosure proposes a method and an electronic device of generating a multiple point of view (MPOV) video. In the present disclosure, the method for generating the MPOV video may include a step of obtaining a plurality of media contents, determining, from the plurality of media contents, a first media content and a second media content as relevant media contents, wherein each of the relevant media contents comprises a scene of a same event, identifying an overlap section comprising a portion of the first media content overlapping with a portion of the second media content, identifying a highlight period by analyzing a content feature of the portion of the first media content and the portion of the second media content within the overlap section, and generating the MPOV video based on the first media content and the second media content within the highlight period.

20 Claims, 12 Drawing Sheets

(56) References Cited

U.S. PATENT DOCUMENTS

| | | | | |
|---|---|---|---|---|
| 2010/0146055 A1* | 6/2010 | Hannuksela | ......... | G11B 27/034 709/206 |
| 2012/0198319 A1* | 8/2012 | Agnoli | ................. | G06F 9/4843 715/202 |
| 2012/0210221 A1* | 8/2012 | Khan | ................... | G11B 27/034 715/716 |

* cited by examiner

METHOD AND ELECTRONIC DEVICE FOR GENERATING MULTIPLE POINT OF VIEW VIDEO

CROSS REFERENCE TO RELATED APPLICATION

This application claims the priority benefit of U.S. provisional application Ser. No. 61/844,439, filed on Jul. 10, 2013. The entirety of the above-mentioned patent application is hereby incorporated by reference herein and made a part of specification.

TECHNICAL FIELD

The present disclosure is related to a method and an electronic device for generating a multiple point of view (MPOV) video.

BACKGROUND OF THE INVENTION

Having diverse functions may allow electronic devices such as a smart phone, a tablet computer, and the likes to become more mobile and versatile. By using an image capture functionality of the electronic device, individuals would be able to record events of their daily lives by capturing and storing the events as media contents under different media formats such as photo, video, audio, and etc. Frequently, individuals may possess a plurality of media contents related to the same event in different points of view, and also these individuals may want to share their media contents having different points of view through emails, social networks, or other means of communication afterwards.

However, by doing so individuals may have to browse through the media contents in order to manually identify the media contents relevant to an interested event, and such actions could be very time consuming. Furthermore, the relevant media contents may not necessarily be sorted or synchronized in time so that individuals would have to manually select and re-arrange the relevant media contents such as to catalog them into a video collection or a photo album.

Consequently, there could be a need to automatically identify relevant media contents of a same event and to sort out and combine these relevant media contents to be presented from multiple points of view.

SUMMARY OF THE DISCLOSURE

The present disclosure proposes a method and an electronic device of generating a multiple point of view (MPOV) video.

In the present disclosure, the method for generating the MPOV video may include a step of obtaining a plurality of media contents, identifying, from the plurality of media contents, a first media content and a second media content as relevant media contents of a same event based on each metadata that corresponds to each of the media contents, identifying a highlight period by analyzing a content feature of the relevant media contents associated with the overlap section, and generating at least a portion of the MPOV video based on the first media content and the second media content within the highlight period.

In the present disclosure, an electronic device for generating the MPOV video is provided. The electronic device would include a processor configured for obtaining a plurality of media contents, identifying, from the plurality of media contents, a first media content and a second media content as relevant media contents of a same event based on each metadata that corresponds to each of the media contents, identifying an overlap section which the first media content and the second media content overlap in time, identifying a highlight period by analyzing a content feature of the relevant media contents within the overlap section, and generating at least a portion of the MPOV video based on the first media content and the second media content within the highlight period.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
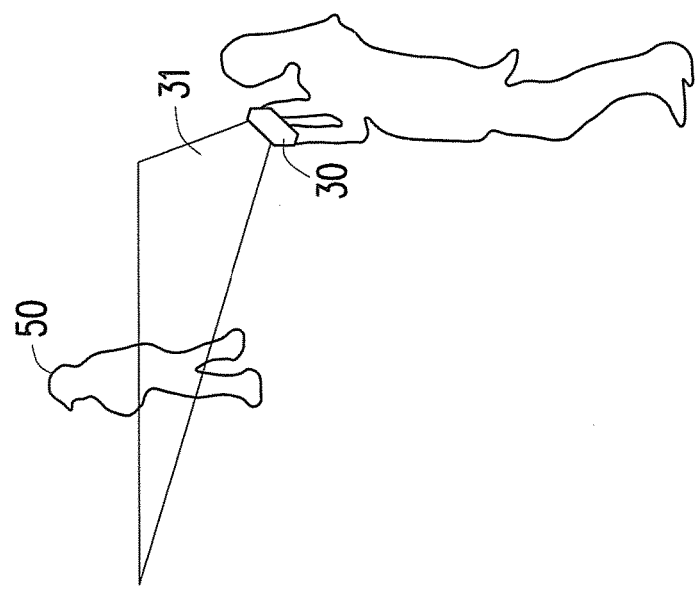
FIG. 1 illustrates a conceptual diagram of collaborative capture of an event from different point of view for generating a MPOV video according to an exemplary embodiment of the disclosure.
Figure 1:
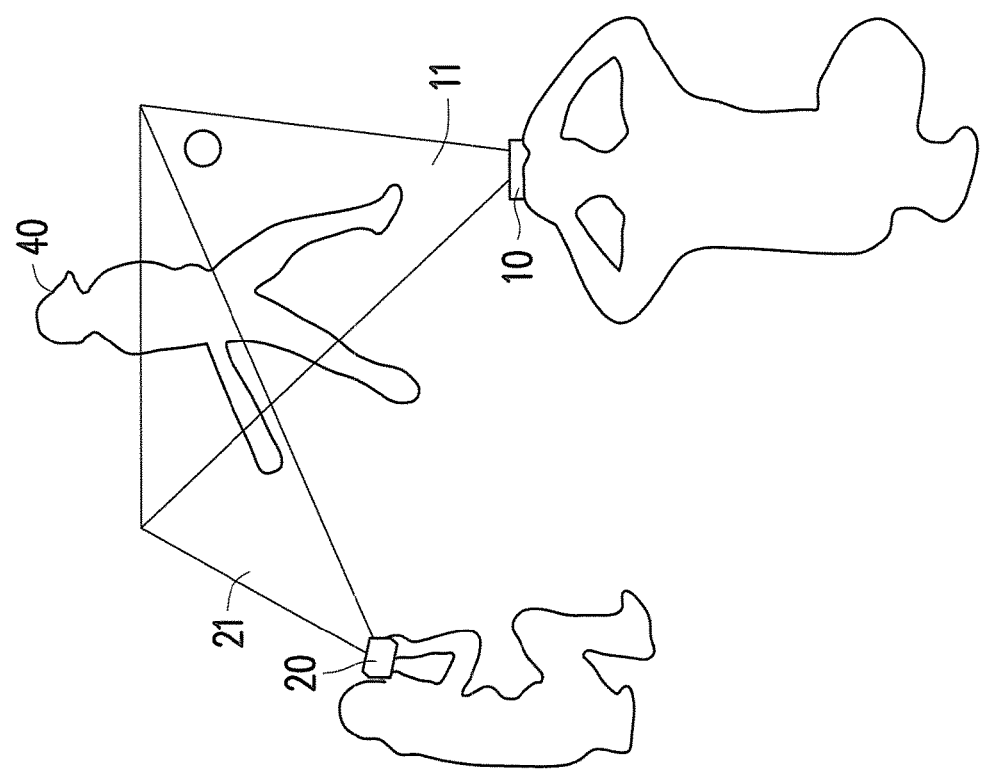

To make the above features and advantages of the application more comprehensible, several embodiments accompanied with drawings are described in detail as follows.

DETAILED DESCRIPTION OF DISCLOSED EMBODIMENTS

Reference will now be made in detail to the present embodiments of the disclosure, examples of which are illustrated in the accompanying drawings. Wherever possible, the same reference numbers are used in the drawings and the description to refer to the same or like parts.

By using an image capturing functionality of an electronic device such as a smart phone, tablet computer or the likes, one could record daily life events by capturing and storing these events as media contents such as photo, video, audio, etc. For example, one may record children in a baseball game using smart phones, tablets, cameras, etc. Consequently, the media contents relevant to the same baseball game could be captured by different individuals from different perspectives. The present disclosure provides a method of generating a multiple point of view (MPOV) video that identifies a relevancy of the media contents such as how media contents are related to an event in time and location. Relevant media contents of the same event would then be used for generating a MPOV video. In the MPOV video, the relevant media contents captured from different point of view would be synchronized in time so that an event captured from different point view in nearly the same moment may be presented simultaneously in each frame of the MPOV video. The relevant media contents could further be analyzed for identifying a highlight period of the event so that the MPOV video would be generated based on the relevant media contents within the highlight period.

FIG. 1 illustrates a conceptual diagram of collaborative capture of an event from different points of view for generating a MPOV video according to an exemplary embodiment of the disclosure. With reference to FIG. 1, a plurality of media contents of an event, such as a batting event shown in FIG. 1, may be captured by different electronic devices. The media contents would include a first media content captured by a first electronic device 10, a second media content captured by a second electronic device 20, and a third media content captured by a third electronic device 30 from different points of view 11, 21, 31.

Figure 2A:
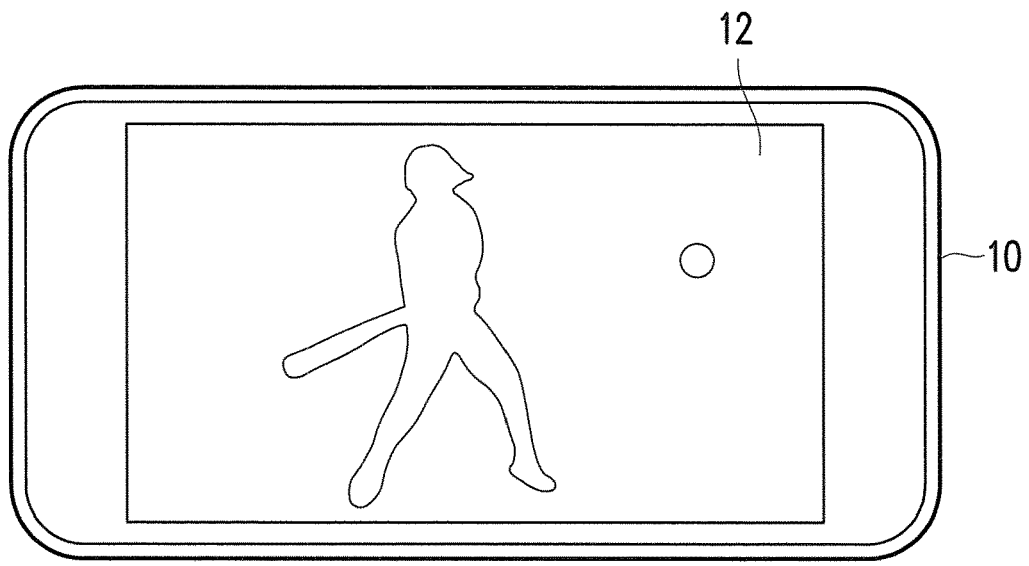
FIGS. 2A-2D are conceptual diagrams illustrating the generation of a MPOV video based on the first media content captured by the first electronic device 10, the second media content captured by the second electronic device 20 and the third media content captured by the third electronic device 30 according to one of the embodiments of the disclosure.
Figure 2B:
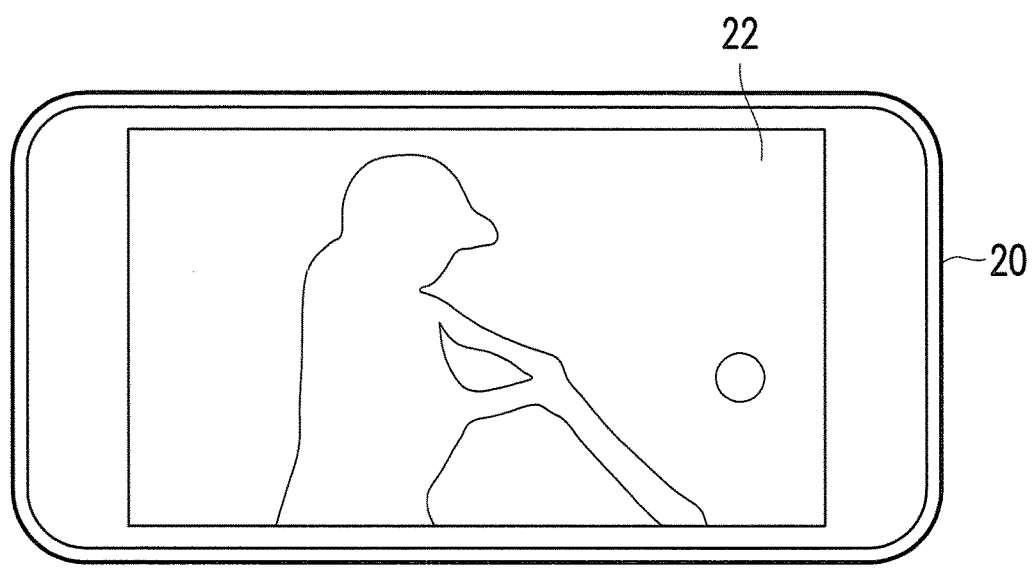
Figure 2C:
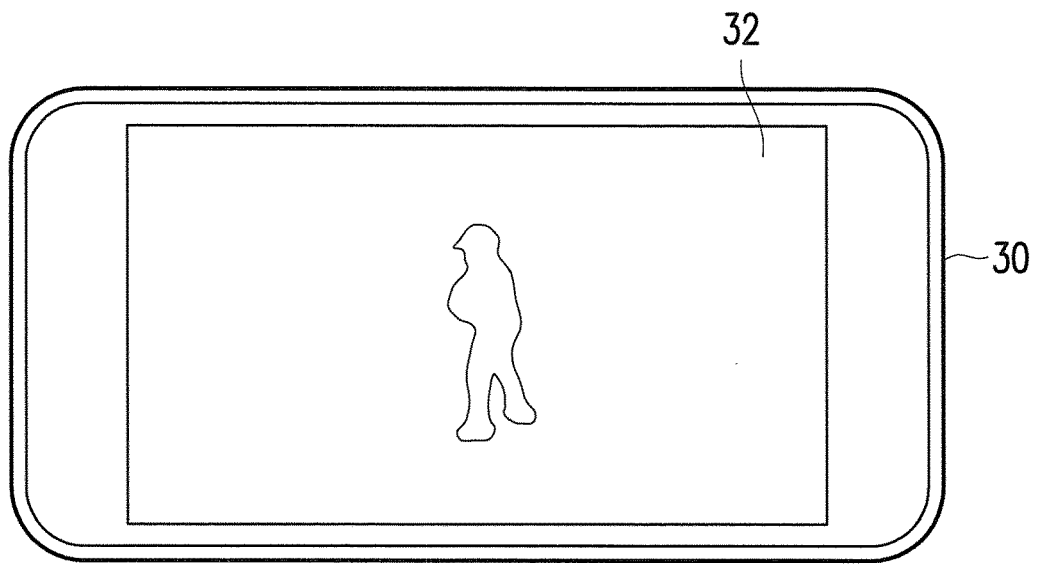

FIGS. 2A-2D are conceptual diagrams illustrating the generation of a MPOV video based on the first media content captured by the first electronic device 10, the second media content captured by the second electronic device 20 and the third media content captured by the third electronic device 30 according to one of the embodiments of the disclosure. With reference to FIGS. 1 and 2A, the batting event is captured from a first view point 11 by the first electronic device 10 from which a first media content 12 captured from the first viewpoint 11 would highlight the batting event from side of a batter 40. With reference to FIGS. 1 and 2B, the batting event is captured from a second viewpoint 21 by the second electronic device 20 from which a second media content 22 captured from the second viewpoint 21 would highlight the batting event from back of the batter 40. With reference to FIGS. 1 and 2C, the batting event is captured from a third viewpoint 31 by the third electronic device 30 from which a third media content 32 captured from the third viewpoint 31 would highlight a pitcher 50 who pitched a ball for the batting event.

Figure 2D:
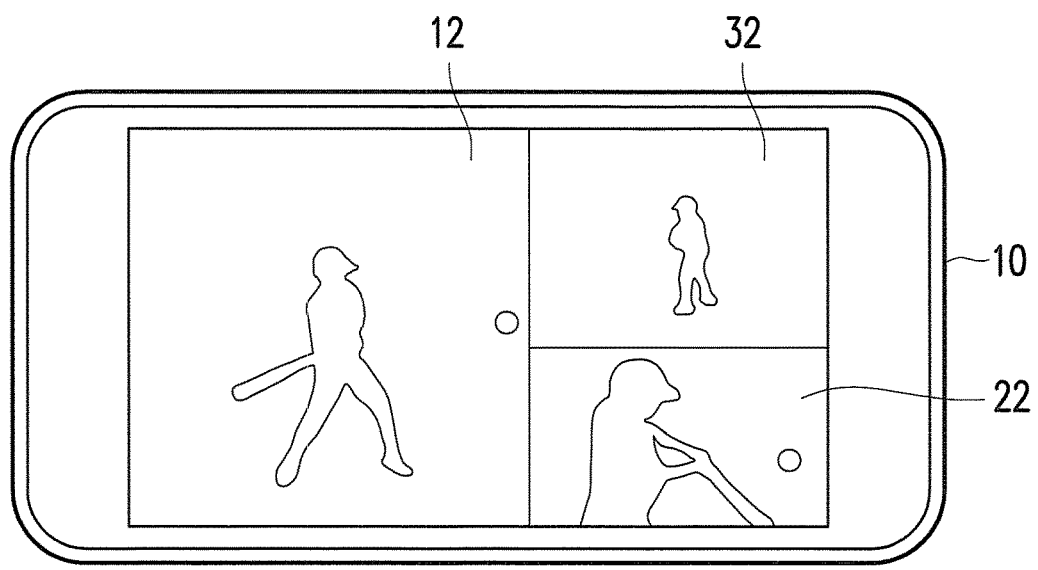

Based on the first, second and third media contents 12, 22, 32 illustrated in FIGS. 2A-2C, the present disclosure would identify whether the first, second and third media contents 12, 22, 32 captured from different viewpoints by different electronic devices would relate to a same event in time and location. Assuming that the first, second and third media contents 12, 22, 32 are related to the same event, the first, second and third media contents 12, 22, 32 would be included for generating a MPOV video showing the batting event from different viewpoints simultaneously as illustrated by FIG. 2D. With reference to FIG. 2D, the MPOV video simultaneously shows the batting event from the first, second and third viewpoints 11, 21, 31 is illustrated, and the MPOV would display the event in a collage style by combining/stitching the first media content 12, the second media content 22 and the third media content 32 in a frame of the MPOV video. Displaying the combined media contents of a same event in the collage style would also be referred to as a collage view of the event later on. The frame of the MPOV video contains at least two portions and each portion may be utilized to display one of media contents.

In one of the embodiments of the disclosure, a frame of the MPOV video may be, but not limited to, split into three portions having a left portion, a top-right portion and a bottom-right portion, and each portion may be utilized to display media contents captured by different electronic devices. For example, in the exemplary embodiment illustrated in FIG. 2D, the first media contents 12 captured from the first viewpoint 11 is collaged to the left portion of the frame of the MPOV video, the second media content 22 captured from the second viewpoint 21 is collaged to top-right portion of the frame of the MPOV video, and the third media content 32 captured from the third viewpoint 31 is collaged to the bottom-right section of the frame of the MPOV video. It should be noted that the media contents may be videos or photos, and the first, second and third media contents captured by different electronic devices would be synchronized in time so that a proximal same moment of the event may be played.

The exemplary embodiment is utilized for illustration purposes and is not intended to limit the position or style of the collage view of the MPOV video. In another exemplary embodiment, the media contents of different viewpoints may be displayed equally in the frame of the MPOV video or any other division. The displaying position of each of the media contents from different viewpoints may be positioned randomly in the collage view of the event.

Figure 3:
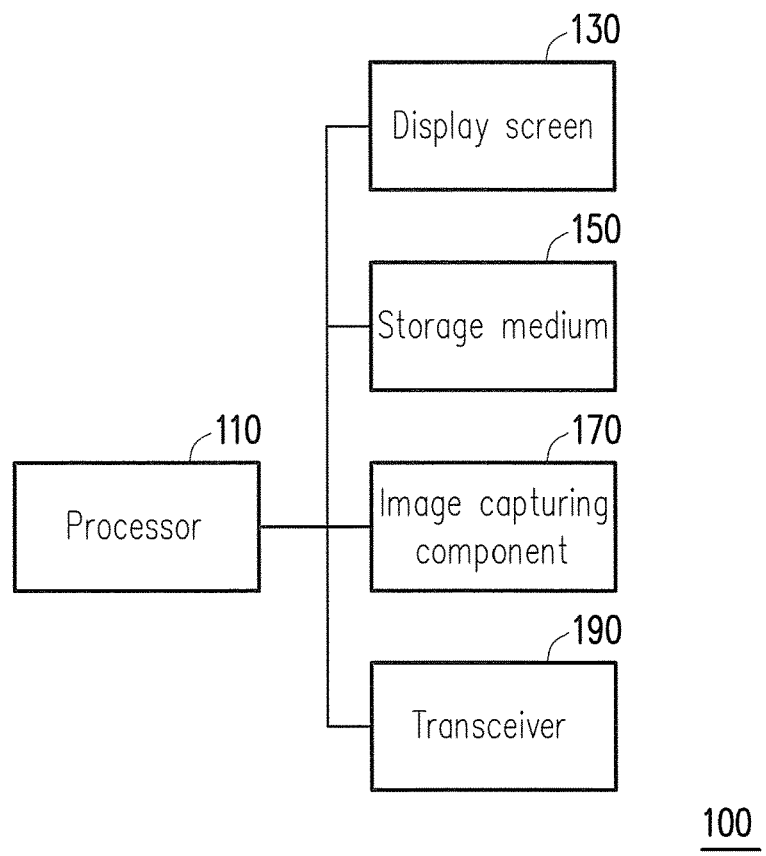
FIG. 3 is a block diagram illustrating the hardware of an electronic device in term of functional blocks according to one of the exemplary embodiment of the disclosure.

FIG. 3 is a block diagram illustrating the hardware of an electronic device in term of functional blocks according to one of the exemplary embodiment of the disclosure. The exemplary electronic device 100 may be a smart phone, a mobile phone, a digital camera, a tablet computer, and so forth. The exemplary electronic device 100 may include at least but not limited to a processor 110, a display screen 130, a storage medium 150, an image capturing component 170 and a transceiver 190. Each components of the exemplary electronic device 100 are explained in details below.

The processor 110 may be, but not limited to, a central processing unit (CPU), or a programmable microprocessor, a digital signal processor (DSP), a programmable controller, an application specific integrated circuit (ASIC), a programmable logic device (PLD) or other similar devices or a combination thereof utilized for general or specific application. In the present embodiment, the processor 110 may be electrically coupled to the display screen 130, the storage medium 150, the image capturing component 170 and the transceiver 190, respectively, where the processor 110 would control all of the operations of the exemplary electronic device 100.

The display screen 130 may be a display device providing a display function within a display area of the electronic device 100. The display device may be, but not limited to, a liquid crystal display (LCD), a light-emitting diode (LED), a field emission display (FED), or so forth.

The storage medium 150 may be volatile or nonvolatile memory storing buffered or permanent data such as media contents captured through the image capturing component 170 or instructions used to execute functions of the exemplary mobile electronic device 100.

The image capturing component 170 may be, but not limited to, a camera, video camera, or the likes which captures scenes through an optical component and an image pickup component as media contents such as photo, video, and the likes. In the disclosure, the media contents representing the scenes of a subjected event may be captured by the image capturing component 170 and stored in the storage medium 150.

The transceiver 190 may be components such as a protocol unit which supports signal transmissions of a global system for mobile communication (GSM), a personal handy-phone system (PHS), a code division multiple access (CDMA) system, a wideband code division multiple access (WCDMA) system, a long term evolution (LTE) system, a worldwide interoperability for microwave access (WiMAX) system, a wireless fidelity (Wi-Fi) system or, or Bluetooth. The transceiver 190 may also be components which support. The transceiver 190 would provide wireless transmission for the electronic device 100 including components, but not limited to, a transmitter circuit, a receiver circuit, an analog-to-digital (A/D) converter, a digital-to-analog (D/A) converter, a low noise amplifier (LNA), Mixers, filters, matching networks, transmission lines, a power amplifier (PA), and one or more antenna units. The transmitter and the receiver transmit downlink signals and receive uplink signals wirelessly. The receiver may include functional elements to perform operations such as low noise amplifying, impedance matching, frequency mixing, up frequency conversion, filtering, power amplifying, and so forth. The analog-to-digital (A/D) or the digital-to-analog (D/A) converter is configured to convert from an analog signal format to a digital signal form during uplink signal processing and from a digital signal format to an analog signal format during downlink signal processing. In the exemplary embodiment of the disclosure, the transceiver 190 may be utilized to wireless transmit or receive the media contents from different electronic devices.

In the following, the generation of the MPOV video according to the relevant media content illustrated in FIG. 1 and FIGS. 2A-2D would be explained in detail with reference to the exemplary electronic device 100 illustrated in FIG. 3.

With reference to FIG. 3, scenes of an event may be captured through the image capturing component 170 of the exemplary electronic device 100, and then the processor 110 would store the scenes of the event as a plurality of media contents such as images, continuous images, audio recordings, and the likes in the storage medium 150 of the exemplary electronic device 100. It should be noted that the continuous images may refer to a plurality of image frames in a video or a plurality of images captured in a burst images mode.

The exemplary electronic device 100 may use the processor 110 to identify a relevancy of the media contents and then generate a MPOV video based on media contents that are related to an event. In one of the exemplary embodiments of the disclosure, a first media content and a second media content among the media contents are utilized as an example for illustration. The processor 110 of the electronic device 100 would identify the first media content and the second media content as related to a same event based on time information and location information. In detail, the processor 110 would extract the time information and the location information from a metadata embedded in or associated with the first media content and the second media content, respectively, for determining whether the first media content is related to the second media content in time and location. It should be noted that the present embodiment of the disclosure does not limit the source of the media contents. That is, the media contents may include media contents captured by the exemplary electronic device 100 or media contents captured by and transmitted from other electronic devices in the vicinity such as any of the electronic devices 10, 20, 30 illustrated in FIG. 1.

Furthermore, in one of the exemplary embodiments of the disclosure, audio information of the first media content and the second media content may be utilized for identifying whether the first media content and the second media content are related to the same event in time and location.

In one of the exemplary embodiments, the time information such as a time stamp, the audio information, and the location information having a geographic tag and surrounding signal information, which correspond to each of the media contents upon capture, may be obtained. In the following, the time information, the audio information and the location information would be described in detail.

The time information of the media contents may include, but not limited to, a timestamp recording date and time of a moment when each of the media contents is captured. The timestamp may be obtained from a system clock of the electronic device 100, where the system clock may be automatically synchronized by a Global Positioning System (GPS), a Wi-Fi access point, a radio access network, a server or the likes. However, the exemplary embodiment is not intended to limit the disclosure, the timestamp may also be configured by a user or any other means.

Figure 4:
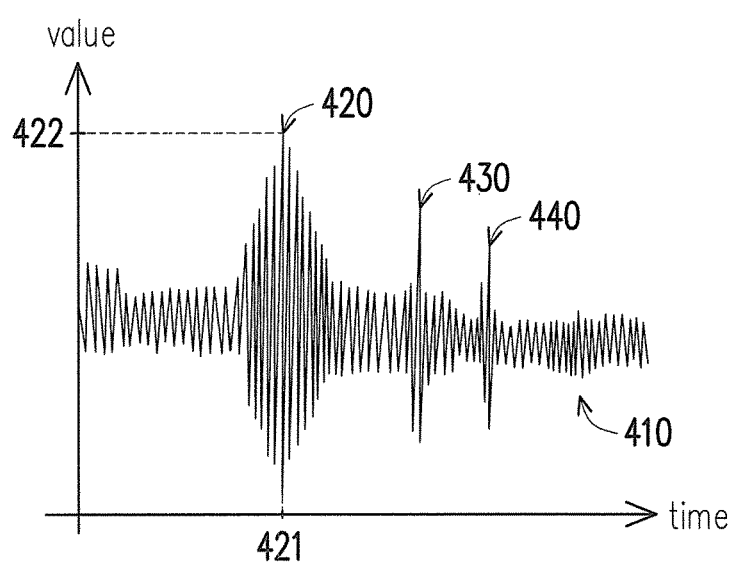
FIG. 4 is a diagram illustrating an audio waveform of the media contents according to one of exemplary embodiment of the disclosure.

The audio information may include, but not limited to, information regarding an audio waveform of the media contents such as a waveform shape, a distinguishable feature having a value at a particular time, and the likes may be obtained. FIG. 4 is a diagram illustrating an audio waveform 410 of the media contents according to one of exemplary embodiment of the disclosure. With reference to FIG. 4, distinguishable features 420, 430, 440 might be obtainable from the audio waveform 410. In one of the exemplary embodiments, a value 422 and a timestamp 421 corresponding to the value 422 may be obtained from the distinguishable feature 420 and subsequently stored in the metadata of the media contents corresponding to the audio information upon capture of each of the media contents. However, the exemplary embodiment is not intended to limit the type of the audio information that is to be embedded in the metadata, other information related to the audio waveform of the media contents may also be utilized. In one of the exemplary embodiment, a shape of a background noise may be utilized. Furthermore, the exemplary embodiment is not intended to limit the disclosure. In one of the exemplary embodiments, the audio information may be extracted from the media content while identifying the relevancy of the media contents. That is, instead of embedding the audio information into the metadata of the media contents, the processor 110 may analyze the media contents in real time for extracting the audio information of the media content as to identify whether the media contents are relevant to the same event.

The location information may include, but not limited to, a geographic tag and surrounding signal information. The geographic tag may include, but not limited to, a GPS position, an accuracy data, or etc. The GPS position and the accuracy data may be obtained from a GPS chip (not shown) of the electronic device capturing the media contents upon capture. The GPS position of the media content may record, but not limited to, a longitude coordinate and a latitude coordinate representing a location where the media contents were captured. The accuracy data would record the accuracy of the longitude coordinate and the latitude coordinate at the moment when the corresponding GPS position is acquired.

The surrounding signal information of the location information may include, but not limited to, information regarding a signal strength of a nearby device such as other mobile electronic devices (e.g., smart phone in a hot spot mode), an access point (AP, e.g., a Wi-Fi router), a radio network access tower, etc. In other words, wireless signals (such as Wi-Fi, Bluetooth or radio signal) between the electronic device 100 and the nearby device may be utilized for determining the relative distance between the locations where each of the media contents was captured. In one of the exemplary embodiments, there is a plurality of wireless devices surrounding the electronic device 100 capturing the media contents, and the signal strength of each of the nearby devices with respect to the electronic device 100 could be analyzed and ranked to form a list ranking the signal strength of the nearby devices. For example, when each of the media contents is captured, the list ranking the signal strength of the nearby devices may be embedded into the metadata of each of the media contents.

Figure 5A:
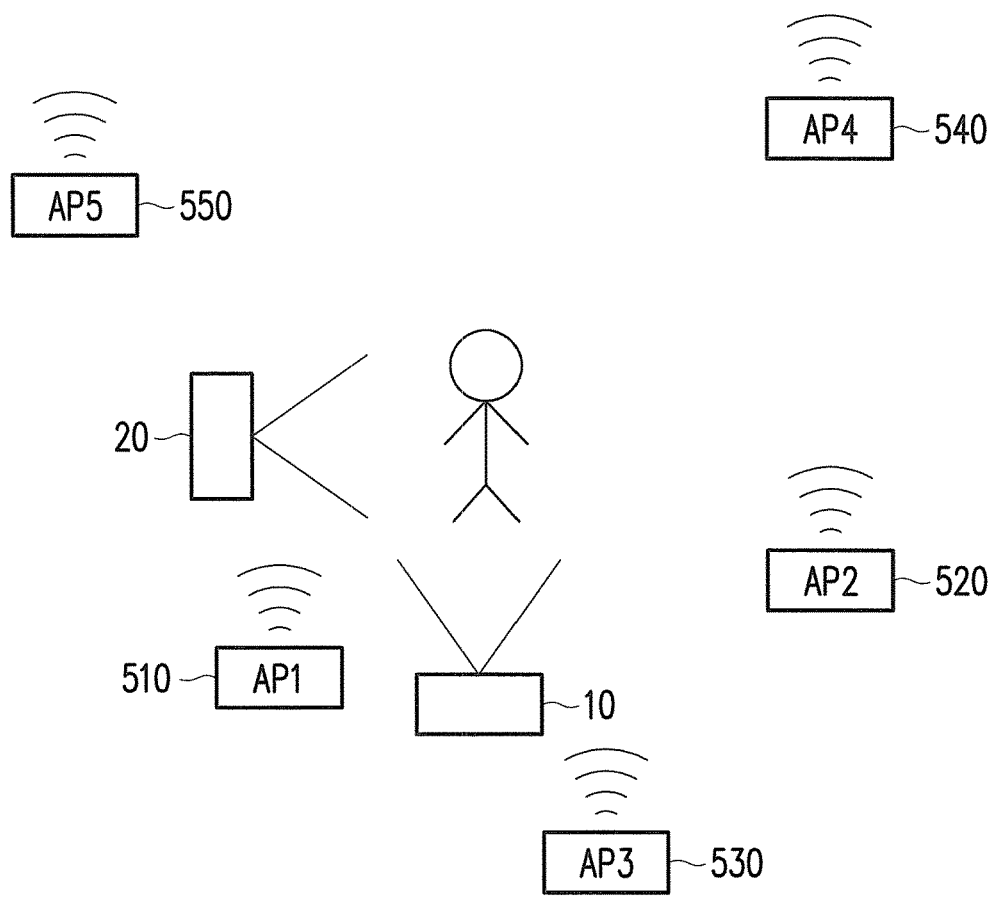
FIGS. 5A and 5B are diagram illustrating the concept of the ranking of signal strength of the nearby device according to one of the embodiment of the disclosure.
Figure 5B:
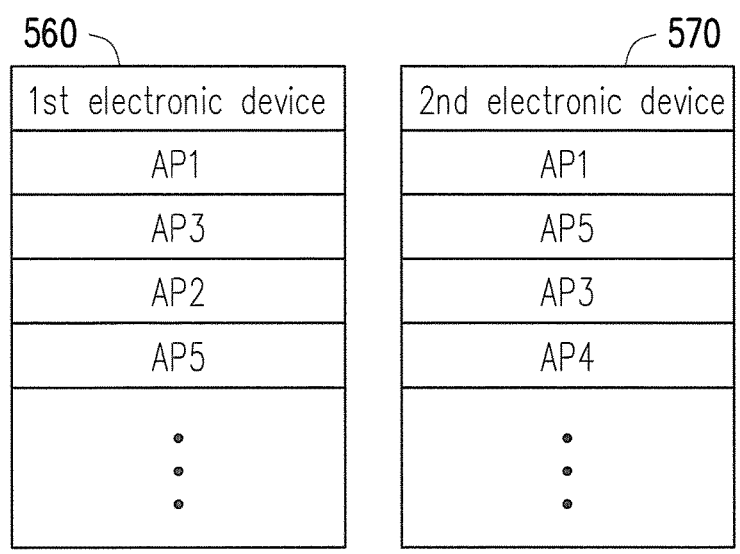

FIGS. 5A and 5B are diagram illustrating the concept of establishing a list of nearby devices which are ranked based on the signal strength according to one of the embodiments of the disclosure. With reference to FIGS. 5A and 5B, an access point 1 (AP) 510, an AP2 520, an AP3 530, an AP4 540 and an AP5 550 are assumed to be nearby a first electronic device 10 and a second electronic device 20. In the embodiment, the first electronic device 10 and the second electronic device 20 would rank the nearby devices based on the signal strength upon the capture of the media contents. For example, a first list 560 may be generated ranking the signal strength of each of the nearby devices with respect to the first electronic device 10 in a sequence of the AP1 510, the AP3 530, the AP2 520, the AP5 550 and so on, and the first list 560 may be embedded in the metadata of the media contents captured by the first electronic device 10. A second list 570 could also be generated ranking the signal strength of each of the nearby devices to the second electronic device 20 in a sequence of the AP1 510, the AP5 550, the AP3 530, the AP4 540 and so on, and the second list 570 could be embedded in the metadata of the media contents captured by the second electronic device 20. In the present embodiment, a Basic Service Set Identification (BSSID) of each of the APs is utilized to identify the APs in the list containing ranked signal strengths of the nearby devices. However, the disclosure is not limited thereto as an AP could be identified by other means.

Furthermore, in an alternative embodiment of the disclosure, the signal strength between the first electronic device 10 and the second electronic device 20 may also be utilized for determining whether the first media content 12 captured by the first electronic device 10 is related to the second media content 22 captured by the second electronic device 20 in location.

In the following, the identification of the relevancy of the first media content and the second media content according to the time information, the audio information, and the location information is described in detail.

In the present embodiment, the processor 110 would identify whether the first media content and the second media content are related to the same event in time according to the time code embedded in the metadata. In detail, the processor 110 would obtain the time code, which indicates a timestamp of the moment when the first media content and second media content are captured, respectively, from the metadata and determine whether the first media content and the second media content are related to the same event. In one of the exemplary embodiment of the disclosure, the processor 110 may calculate a time difference between the time codes of the first media content and the second media content and determine whether the time difference between the first media content and the second media content is within a predetermined range. For example, the predetermined range may be 2 hours. The processor 110 would consider that the first media content and the second media content as related to the same event in time if the time difference between the first media content and the second media content is within 2 hours.

However, the disclosure is not limited thereto. In one of the exemplary embodiments of the disclosure, the first media content and the second media content would be identified as being related to each other in time when the time code of the first media content and the second media content are within a predetermined time period indicating the occurrence of the event. For example, a baseball event may occur between 4:00 pm to 9:00 pm on May $1^{st}$, and the predetermined time period could be configured as 4:00 pm to 9:00 pm for example. The first media content and the second media content would be identified as related to the baseball event in time if the time code indicates that the first media content and the second media content were capture between 4:00 pm to 9:00 pm. It should be noted that the predetermined time period may be determined automatically by the media contents or configured by an individual. For example, there may be a period of time where no media content is captured before and after the baseball event. The processor 110 would automatically detect a time interval between these periods of time where no media content is captured as the predetermined time period and group media contents captured during the predetermined time period into a media collection. It should be noted that the predetermined time period would conveniently serve as one of the parameters of a set of relevance criteria for identifying whether any media content is related to the event in time.

In the disclosure, the processor 110 would also identify whether the first media content and the second media content are relevant to the same event in location according to the audio waveform 410, the geographic tag or the surrounding signal information. Detail descriptions of identifying the location relevancy of the media contents are described below.

To determine whether the media contents are relevant to the event in location, the processor 110 may utilize the distinguishable feature 420, 430, 440 of the audio waveform 410 of the first media content and the second media content, which are illustrated in FIG. 4. For example, in the batting event, the distinguishing feature 410 could be a noise produced when a baseball contacts a bat (i.e., a batting noise), and the distinguishing feature 420, 430 could be cheering noise produced by crowd. The processor 110 would consider the first media content and the second media content having the batting noise and cheering noise related to the same event in location.

In one of the exemplary embodiment of the disclosure, the first media content and the second media content may be identified to be related to the same event in location according to the geographic tag. The processor 110 may obtain the geographic tag such as the GPS position and the accuracy data from the metadata of the first media content and the second media content. The processor 110 would identify the first media content and the second media content to be related to the same event in location by utilizing the GPS positions of the first media content and the second media content. For example, the processor 110 would determine whether a difference between the GPS positions where the first media content and the second media content are captured is within a predetermined distance. If the difference is within the predetermined distance, the first media content and the second media content are considered to be related to the same event in location. The predetermined distance may be configurable according to the practical application; the disclosure is not intended to limit the range of the predetermined distance, where it may be configured to be any number within 500 meters for a baseball stadium or any number within 5 kilometers for a race track.

In one of the exemplary embodiments of the disclosure, the processor 110 may identify the first media content and the second media content are related to the same event according to the GPS position of the first and second media contents and a predetermined geographic coordinate of the subjected event. The predetermined geographic coordinate may be a GPS coordinate representing where the event has occurred, which may be obtained automatically from the GPS position of media contents that have been identified as related to the event. The disclosure is not intended to limit the acquisition of the predetermined geographic coordinate of the subjected event, the GPS coordinate representing where the event has occurred may also be manually configured by an individual. For example, the individual may manually insert a GPS coordinate of a particular location (such as a baseball stadium) as the predetermined geographic coordinate. In the exemplary embodiment, the processor 110 would determine whether the GPS positions of the first and second media contents are within a predetermined distance with respect to the predetermined geographic coordinate of the subjected event. In the embodiment, the predetermined geographic coordinate could be one of the parameters of the set of relevance criteria.

Furthermore, the processor 110 would analyze the accuracy data of the geographic tag to determine whether the accuracy of the GPS position is within a predetermined range. In other words, the processor 110 would determine whether the GPS position obtained when the first and second media contents are captured is trustworthy. In the present exemplary embodiment, the predetermined range may be configured to, but not limited to, any number range within 100 meters. That is, the processor 110 would utilize the GPS position for identifying whether the first and second media contents are related to the same event in location when the accuracy data of the geographic tag is within the predetermined range. On the other hands, if the accuracy data indicates that the GPS position is not with in the predetermined range, the processor 110 would not consider the GPS position of the geographic tag for the identification of whether the first and second media contents are related to the event.

In one of the exemplary embodiments, the processor 110 would identify whether the first and second media contents are related to the same event according to the surrounding signal information. In detail, the processor 110 would obtain the list 560, 570 ranking the nearby device based on the signal strength from the metadata of the first and second media contents. In the embodiment illustrated in FIGS. 5A and 5B, the list 560, 570 would include nearby device ranked from high to low according to the signal strength of the nearby device to the electronic device. The exemplary embodiment includes a first electronic device 10 and a second electronic device 20 capturing the event at interest into a plurality of media contents from different point of view.

For example, the first electronic device 10 would capture the first media content, and the second electronic device 20 would capture the second media content. In the vicinity, there are an AP1 510, an AP2 520, an AP3 530, an AP4 540 and an AP5 550. The processor 110 may determine whether the first and second media contents are related to the same event in location according to the ranking of the APs listed in the lists 560 and 570. The list 560 would rank the APs surrounding the first electronic device 10 upon capture of the first media content based on the signal strength between the APs and the first electronic device 10, and the list 570 would rank the APs surrounding the second electronic device 20 upon capture of the second media content based on the signal strength between the APs and the second electronic device 20. In the exemplary embodiment, the processor 110 would compare the ranking of the AP1 510, the AP2 520, the AP3 530, the AP4 540 and the AP5 550 between the lists 560 and 570.

For example, in one of the exemplary embodiments, at least three of the APs listed in the lists 560 and 570 has to be the same, and at least two APs out of the at least three APs has to be ranked top three in the list for the processor 110 to consider the first and second media contents are related to the same event in location according to the signal strength of the nearby device. However, the disclosure is not intended to limit the requirement for identifying the relevancy of the first and second media content, the requirement may be designed according to the practical application. For example, in other exemplary embodiments based on surrounding signal information, the requirement for identifying the first and second media contents to be related to the same event may be two matching APs in the list and any one of the two matching APs is ranked top three in the list.

In one of exemplary embodiments of the disclosure, the relevancy of the media contents may also be identified according to a Wi-Fi Direct signal in the absence of the nearby APs. For example, an exemplary electronic device 100 may have the capability of communicating with other electronic devices in the vicinity through Wi-Fi Direct in a hot spot mode. Wi-Fi Direct signal strength between the exemplary electronic device 100 and the other electronic devices in the vicinity may be detected and stored in the metadata of each of the media contents. Then, when identifying the first and second media contents to be related to the same event in location, a processor 110 of the exemplary electronic device 100 may utilize the Wi-Fi Direct signal strength of other electronic devices in the vicinity to determine whether the media contents captured by different electronic devices are related to each other.

Based on the above, the disclosure would identify that the first and second media contents are related to the same event in time and location according to the time code, audio waveform, geographic tag and the signal strength of the nearby device, and details of each steps are described above. In one of the embodiment of the disclosure, the processor 110 may first determine whether the first and second media contents are related to the same event in time according to the time code. If the first and second media contents are not related in time, the processor 110 would consider that the first and second media contents are not related to same event in location either. If it is determined that the first and second media contents are related in time, the processor 110 would then determine whether the first and second media contents are related to the same event in location in a sequence of audio waveform, geographic tag, and the signal strength of the nearby device. However, the disclosure is not limited thereto. The sequence of identifying whether the first and second media contents are related to the same event in time and location may be modified to satisfy the design requirement of the practical application.

Once the first and second media contents are identified to be related to the same event, the processor 110 would then provide the first and second media contents as candidate media contents for generating the MPOV video.

After the identification of the relevancy of the first and second media contents, the exemplary electronic device 100 would further synchronize the first and second media contents according to the time code and the audio information. In detail, the processor 110 would arrange the first media content and the second media content according the timestamp of the first media content and the timestamp of the second media content. For example, the first and second media contents may be arranged according to a start time and a stop time of each of the first and second media contents.

Furthermore, the processor 110 may also arrange the first and second media contents according to an audio waveform. As mentioned above, the information regarding the audio waveform of the media contents may be extracted from the media contents such as the value and the timestamp corresponding to the value of the distinguishable feature of the audio waveform. In the example of the batting event described above, the first media content and the second media content may be arranged based on the batting noise produced when the bat contacts the ball. For example, the processor 110 would identify a value (e.g., value 422 illustrated in FIG. 4) representing the batting noise in the first and second media contents, and then align the first and second media contents on a unified timeline based on the timestamp corresponding to the value (e.g, the timestamp 421 illustrated in FIG. 4). However, the disclosure is not limited thereto. The first media content and the second media content may be aligned according to other characteristics of the audio waveform such as a shape of the distinguishable feature.

Once the first media content and the second media content are synchronized in time, the processor 110 would identify an overlap section where the first and second media contents overlaps in time. In one of the exemplary embodiment, the overlap section may be identified according to the start time and end time of the first and second media contents.

Afterward, the processor 110 would further identify the highlight period associated with the overlap section according to a content feature of the first media content or the second media content. The content feature may refer to a media type and a shot type of the media content, where the media type of the media content may be a still image or continuous images, and the shot type of the media content may be a closed-up shot, a medium shot, a zoom-in shot, or a zoom-out shot. The media type and the shot type of the media content may be utilized to automatically determine a highlight of an event.

In one of the exemplary embodiments, a facial detection may be implemented to determine a ratio between a portion of a frame occupied by the object and the other portion of the frame not occupied by the object. If the ratio of the object occupying the frame exceeds a predetermined ratio, the processor 110 would identify the shot type of the frame of the second media content as the closed-up shot. For example, the predetermined ratio could be any number such as 60% or above. When the object occupies at least 60% of the frame, the processor 110 would identify the frame having the object occupying at least 60% of the frame as the closed-up shot. Furthermore, the processor 110 would also identify a medium shot (e.g., a scenery shot) for frames having the object occupying an area less than 60%. In a case of the continuous images, the above technique may be utilized to determine whether the shot type of a video is a zoom-in shot or zoom-out shot by analyzing an area occupied by an object of each frame of the video.

In one of the exemplary embodiments, the media type of the media content is utilized to identify the highlight period associated with the overlap section. For example, a scene of the event that is captured as a still image associated with the overlap section would be considered as a highlight of the event. In one of the embodiments of the disclosure, the shot type of the media content may be utilized to identify the highlight period associated with the overlap section. The highlight period may be identified according a media content captured in the type of closed-up shot or zoom-in shot, because it may be a tendency for an individual to take closed-up shot or zoom-in shot for a moment considered to be a highlight of the event.

Figure 6:
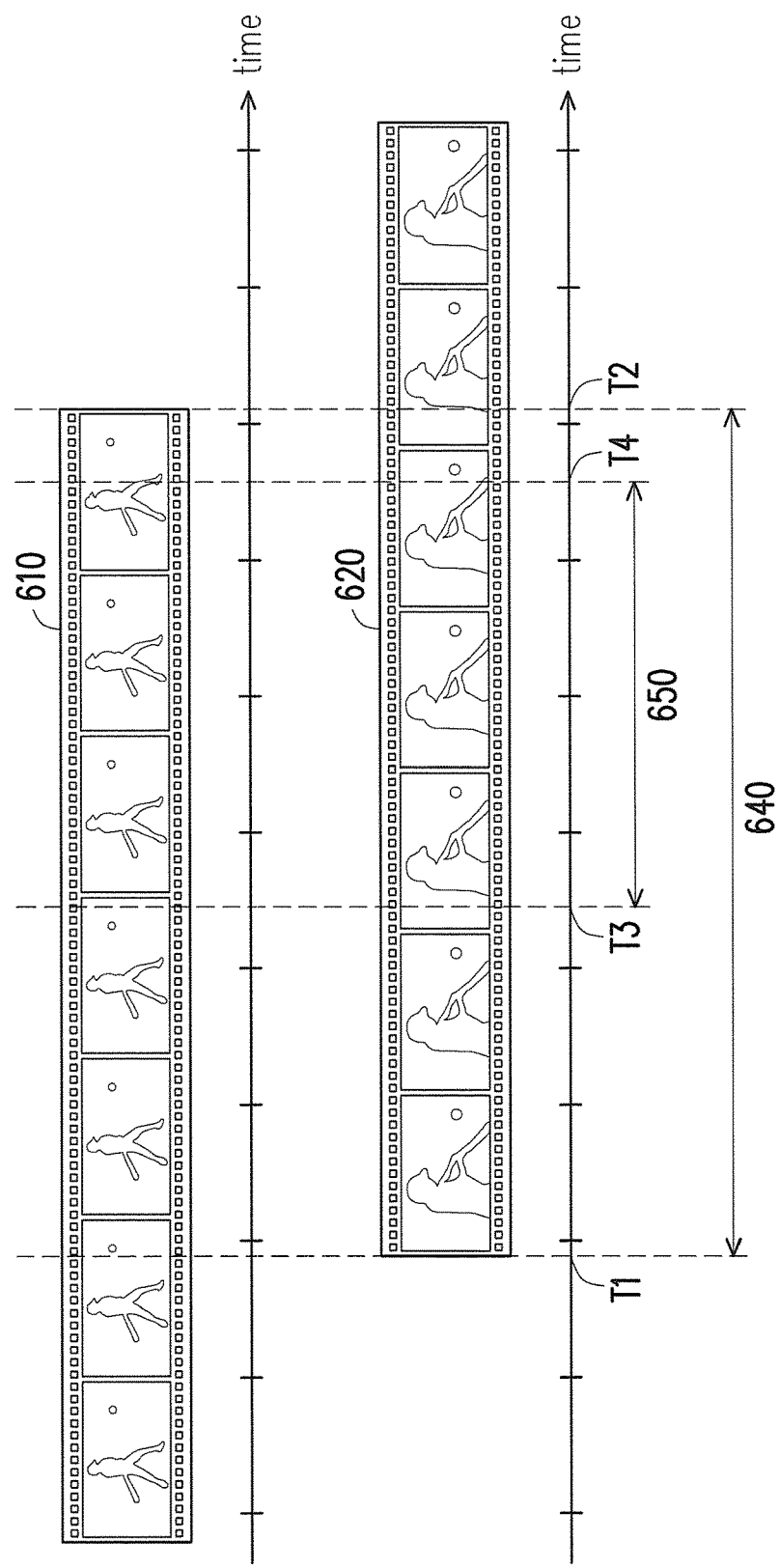
FIG. 6 is a diagram illustrating a synchronization of the first media content and the second media content on a timeline according to one of the exemplary embodiment of the disclosure.
Figure 7:
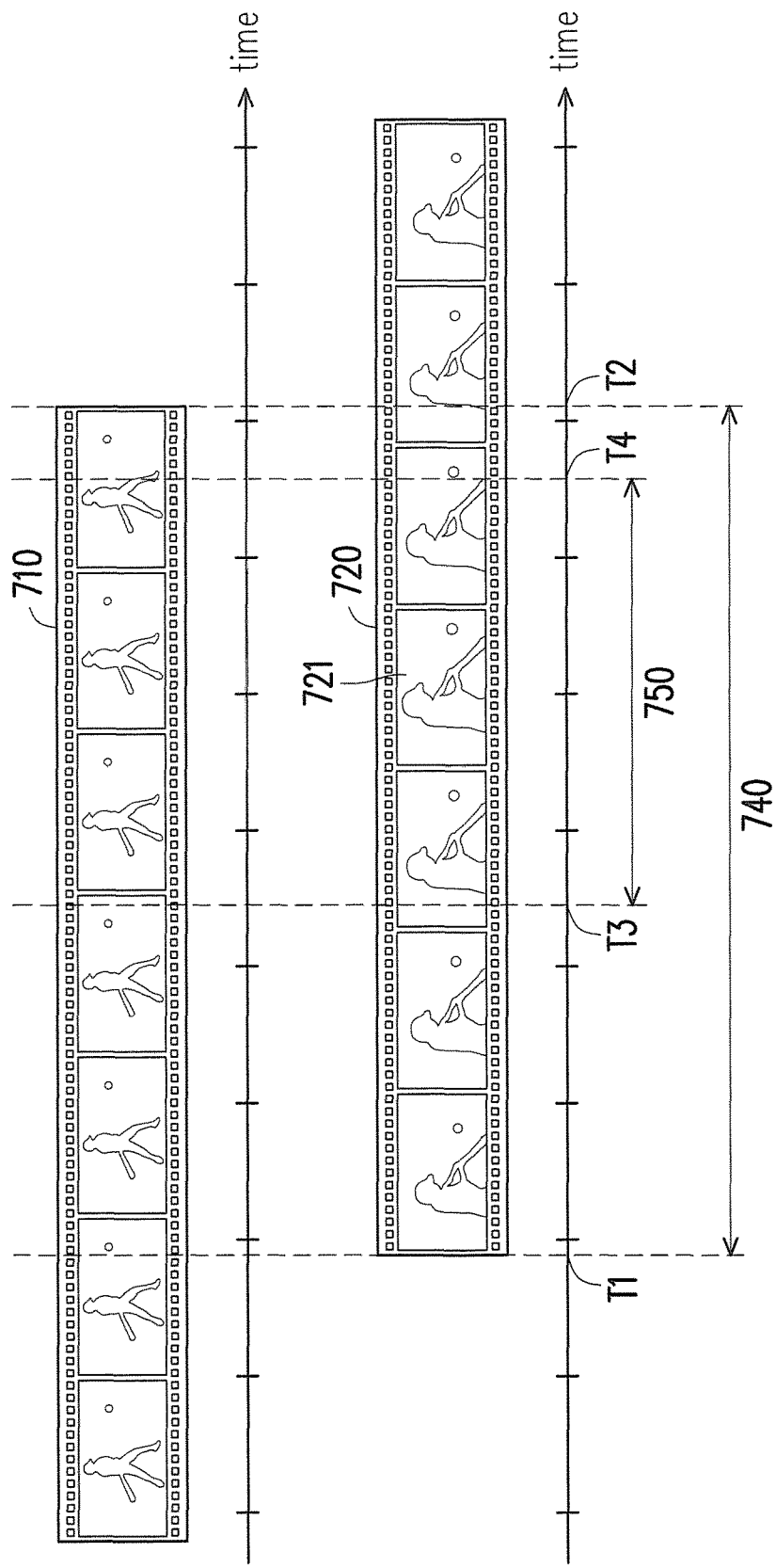
FIG. 7 is a diagram illustrating a synchronization of the first media content and the second media content when the first media content is a still image according to one of the exemplary embodiment of the disclosure.
Figure 8:
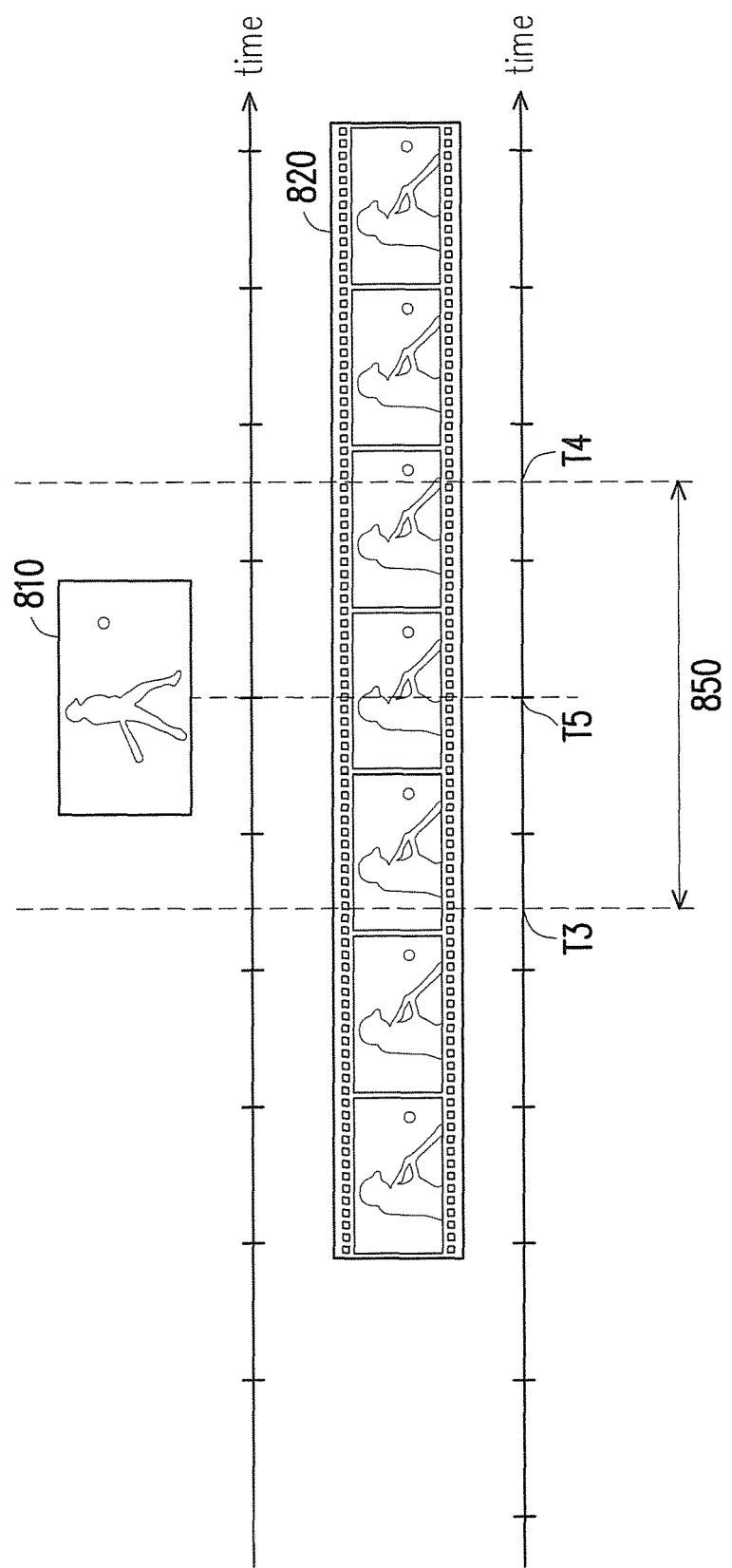
FIG. 8 is a diagram illustrating a synchronization of a first media content, a second media content and a third media content according to one of the exemplary embodiments of the disclosure.

In the following, FIGS. 6-8 are specific exemplary embodiments utilized to elaborate the details of identifying the highlight period within the overlap section of the first and second media contents.

FIG. 6 is a diagram illustrating a synchronization of the first media content and the second media content on the unified timeline according to one of the exemplary embodiment of the disclosure. When a first media content 610 and a second media content 620 are synchronized in time, the processor 110 would further identify an overlap section 640 in which the first media content 610 and the second media content 620 overlaps in time between a first time stamp T1 and a second time stamp T2. In other words, the overlap section between the first media content 610 and the second media content 620 would represent the same real life event captured from different perspectives at a proximal same time. In the present embodiment, the overlap section of the first and second media contents 610, 620 may be identified according to a start time of the second media content 620 and an end time of the first media contents 610.

With reference to FIG. 6, the first media content 610 and the second media content 620 are the continuous images having the overlap section 640 between the first time T1 and the second time T2. The continuous images would include a plurality of frames. The processor 110 would analyze the first media content 610 and the second media content 620 within the overlap section 640 to determine the media type and the shot type for identifying a highlight period associated with the overlap section 640. In detail, the processor 110 would determine that the first and the second media contents 610, 620 are continuous images. Further the processor 110 would identify that the second media content 620 is the closed-up shot of an object since an object (e.g., the batter) captured by the second media content 620 occupies an area greater than a predetermined ratio (e.g., 60%) of a frame of the second media content 640 associated with the overlap section 640. The area occupied by the object are similar throughout every frame of the second media content 620 associated with the overlap section 640, therefore, the shot type of the second media content 620 is determined to be the close-up shot.

In the exemplary embodiment illustrated in FIG. 6, the processor 110 would identify a highlight period 650 within the overlap section 640 since media type of the second media content 620 is identified as close-up shot. That is, an area occupied by an object within a frame of the second media content 620 associated with the overlap section is greater than the predetermined ratio. It should be noted that the overlap section 640 may have footages of the event in a great length (e.g., 5 minutes). The processor 110 may define the highlight period 650 by a predetermined duration (such as any length of time below 5 minutes), however, the disclosure is not limited thereto. In the present exemplary embodiment, the highlight period 650 could be defined between a third time T3 and a fourth time T4. The highlight period 650 defined by the third time T3 and the fourth time T4 may be selected within the overlap section 640 randomly and may have a predetermined duration. The disclosure is not intended to limit the duration and the selection of the highlight period 650 within the overlap section 640 having the close-up shot type of the media content.

FIG. 7 is a diagram illustrating a synchronization of a first media content 710 and a second media content 720 on an unified timeline according to one of the exemplary embodiment of the disclosure. In the exemplary embodiment, the second media content 720 is a continuous image captured in a zoom-in and zoom-out shot type, where an area occupied by an object in a frame of the second content 720 increases and decreases. As mentioned above, it may be a tendency of an individual to zoom-in at an object when a moment is considered to be a highlight of the event. Therefore, the processor 110 would analyze the second media content 720 and identify a frame 721 of the second media content 720 within the overlap section 740 as a highlight point. Then, the processor 110 would identify a time period having a predetermined duration defined by a third time T3 and a fourth time T4 and centered at a timestamp of the frame 721 of the second media content as a highlight period 750 since the area occupied by the object in the frame 721 of the second media content 720 exceeds a predetermined ratio (e.g. 60%). Accordingly, the processor 110 would select the first media content 710 and the second media content 720 within the highlight period 750 as candidate sources for generating the MPOV video.

FIG. 8 is a diagram illustrating a synchronization of a first media content 810 and a second media content 820 when the first media content 810 is a still image according to one of the exemplary embodiment of the disclosure. In the exemplary embodiment, a first media content 810 is a still image and a second media content 820 is a continuous image (e.g., video or burst images). The processor 110 would identify an overlap section in which the first media content 810 overlaps with the second media content 820 at a fifth time T5 which is defined by a timestamp of the first media content 810. The processor 110 would identify a highlight period 850 centering at a timestamp of the first media content 810 between a third time T3 and a fourth time T4 since the media type of the first media content 810 is a still image. In other words, the processor 110 may select a time interval having a predetermined duration before and after the fifth time T5 as the highlight period 850. However, the disclosure is not limited thereto, the highlight period 850 may be selected by other means. Accordingly, the processor 110 would select the first media content 810 and the second media content 820 within the highlight period 850 as candidate sources for generating the MPOV video.

Figure 9:
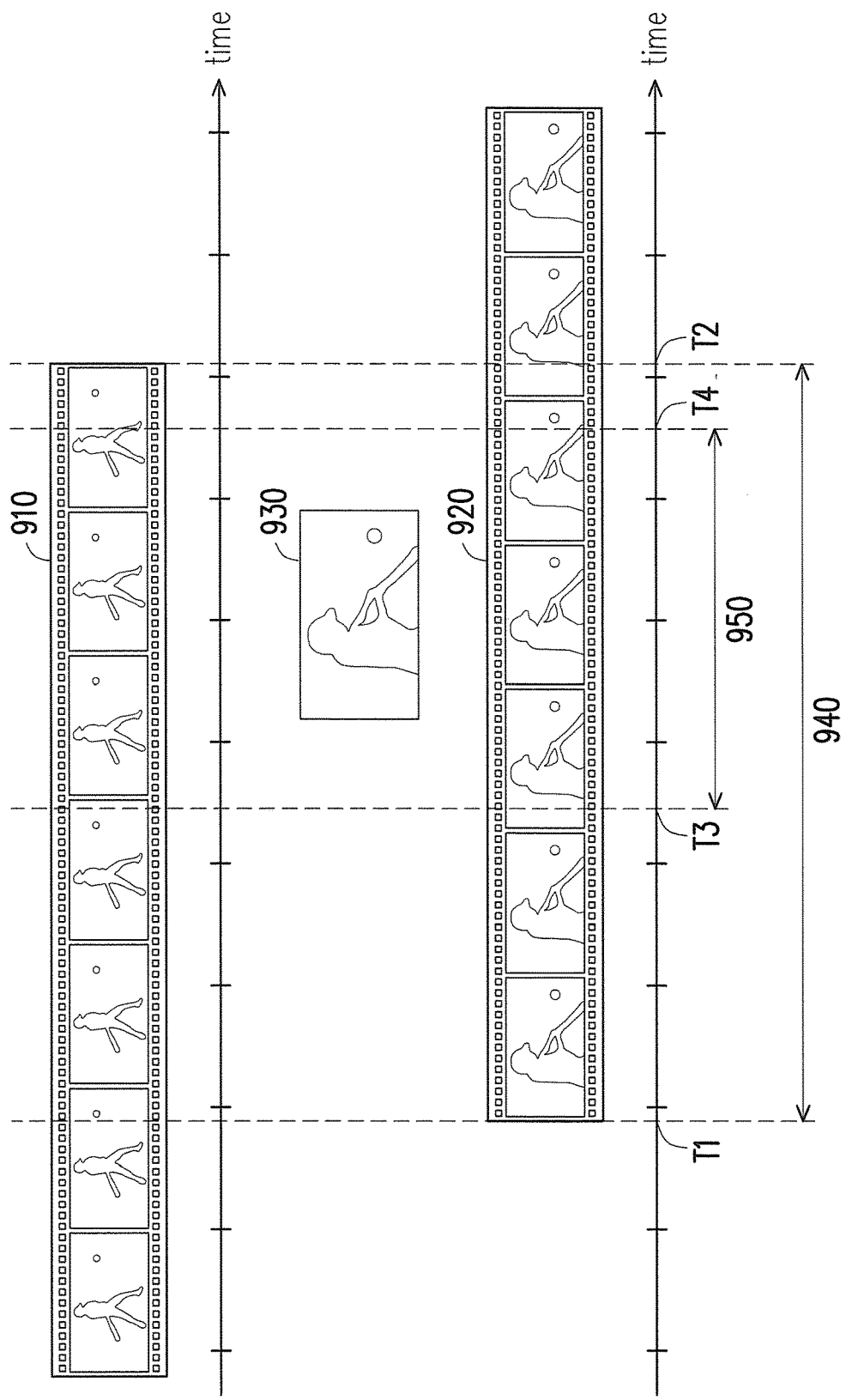
FIG. 9 is a flow diagram illustrating a method of generating a MPOV video according to one of the embodiments of the disclosure.

FIG. 9 is a diagram illustrating a synchronization of a first media content 910, a second media content 920 and a third media content 930 according to one of the exemplary embodiments of the disclosure. In the exemplary embodiment, the second media content 920 being continuous images and the third media content 930 being a still image are captured by the same electronic device at the same event period. The third media content 930 could be obtained while the capturing of the second media content 920. The processor 110 would identify an overlap section 940 in which the first media content 910 overlaps with the second media content 920 and the third media content 930 between a first time T1 and a second time T2. Then, the processor 110 would identify a highlight period 950 defined between a third time T3 and a fourth time T4 and centered at a timestamp of the third media content 930. The determination of a time interval of the highlight period 950 is similar to the exemplary embodiment illustrated in FIG. 8, and thus it is omitted here. Accordingly, the processor 110 would select the first media content 910, the second media content 920, and the third media content 930 within the highlight period 950 as candidate sources for generating the MPOV video.

Figure 10A:
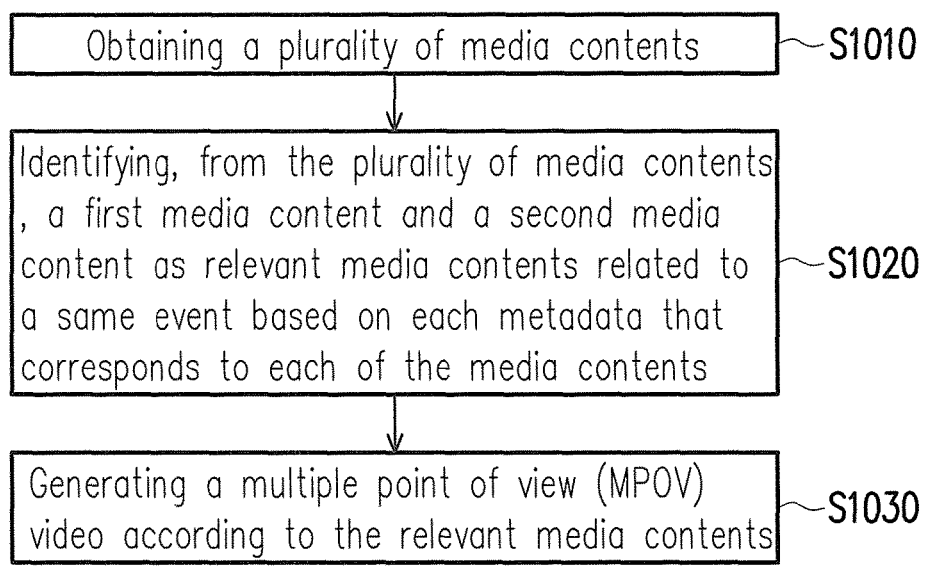
FIGS. 10A and 10B are flow chart diagrams illustrating a method of generating a MPOV video based on relevant media contents according to one of the embodiments of the disclosure.
Figure 10B:
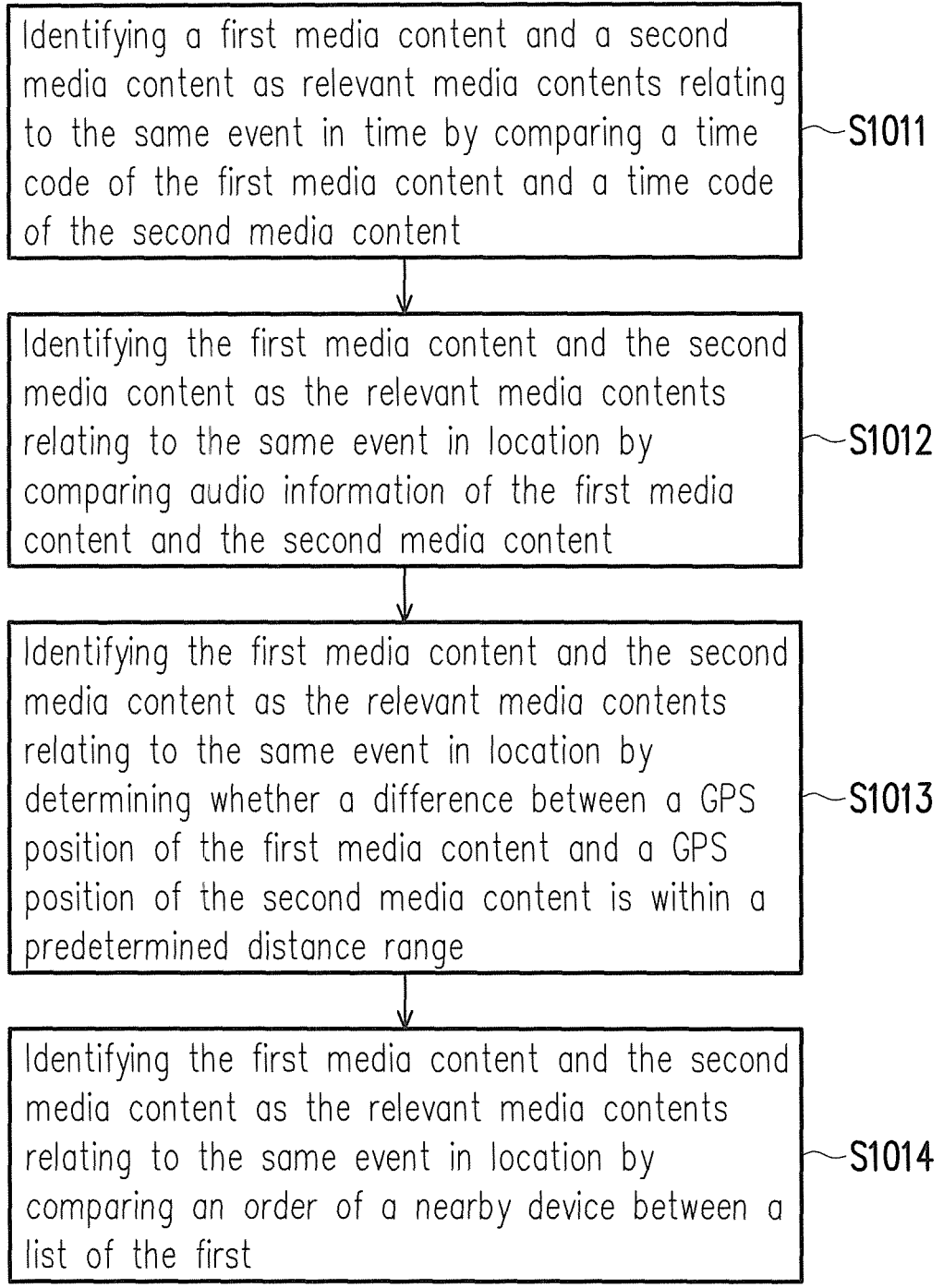

FIGS. 10A and 10B are flow diagrams illustrating a method of generating a MPOV video according to one of the embodiments of the disclosure. With reference to FIG. 10A, in step 1010, an exemplary electronic device 100 would obtain a plurality of media contents. In step S1020, the exemplary electronic device 100 would identify, from the plurality of media contents, a first media content and a second media content as relevant media contents related to a same event based on each metadata that corresponds to each of the media contents, wherein the metadata comprises a time information and a location information In step S1030, the exemplary electronic device 100 would generate a multiple point of view (MPOV) video according to the relevant media contents.

The detail regarding the identification of the first media content and the second media content of S1020 in FIG. 10A would be described in FIG. 10B as follows. With reference to FIG. 10B, in step S1011, the exemplary electronic device 100 would identify a first media content and a second media content as relevant media contents relating to a same event in time by comparing a time code of the first media content and a time code of the second media content. In step S1012, the exemplary electronic device 100 may identify the first media content and the second media content as the relevant media contents relating to the same event in location by comparing audio information of the first media content and the second media content. In step S1013, the exemplary electronic device 100 may determine whether the accuracy data is within the predetermined accuracy range, and then identify the first media content and the second media content as the relevant media contents relating to the same event in location by determining whether a difference between a GPS position of the first media content and a GPS position of the second media content is within a predetermined distance when the accuracy data is within the predetermined accuracy range. In step S1014, the exemplary electronic device 100 may identify the first media content and the second media content as the relevant media contents relating to the same event in location by comparing an order of a nearby device between a list of the first media content and a list of the second media content.

Figure 11:
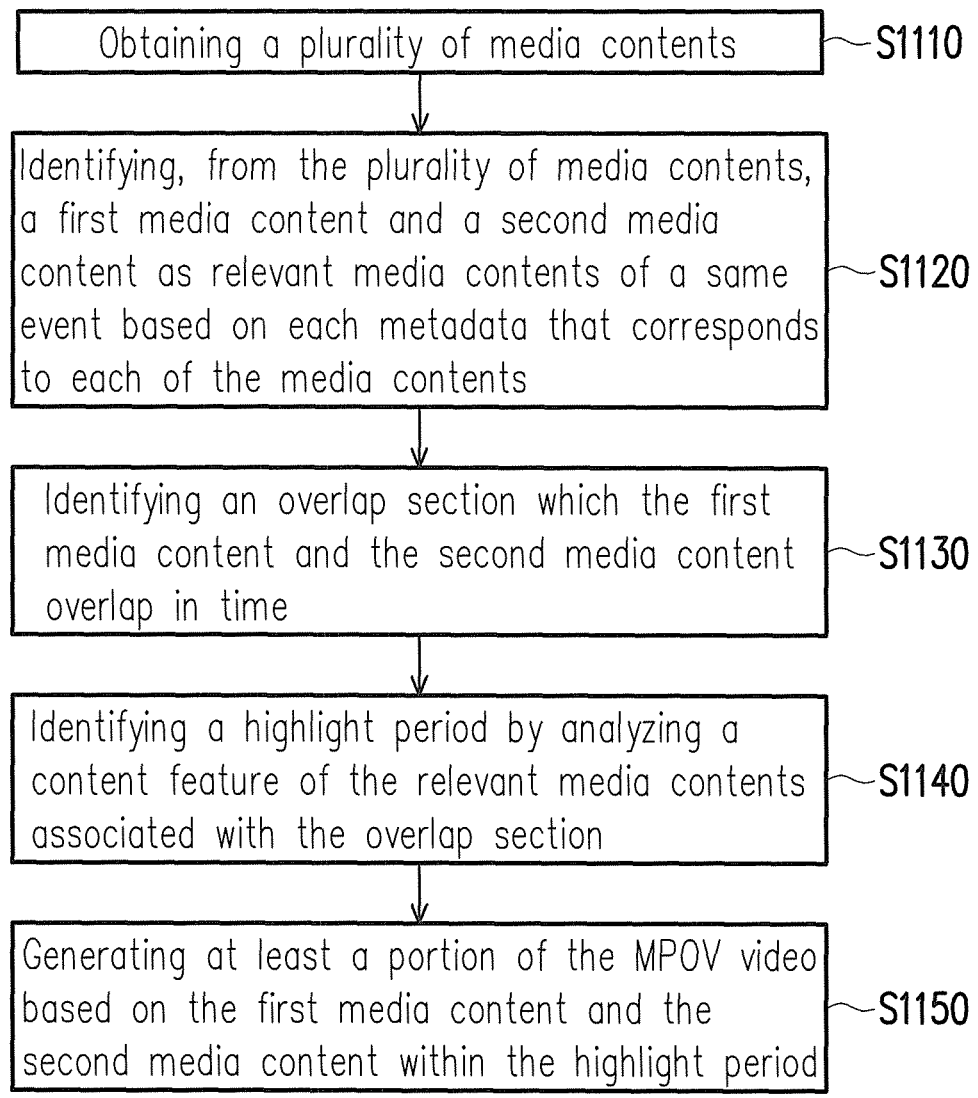
FIG. 11 is a flow chart diagram illustrating a method of generating a MPOV video based on media contents within the highlight period according to one of the embodiments of the disclosure.

FIG. 11 is a flow chart diagram illustrating a method of generating a MPOV video based on media contents within the highlight period according to one of the embodiments of the disclosure. In the exemplary embodiment illustrated in FIG. 11, steps S1110 and S1120 would be similar to the steps S1010 and S1020 illustrated n FIG. 10, and thus the description of the steps S1110 and S1120 are omitted.

With reference to FIG. 11, in step S1130, the exemplary electronic device 100 would identify an overlap section which a first media content and a second media content overlap in time. In step S1140, the exemplary electronic device 100 would identify a highlight period by analyzing a content feature of the first media content and the second media content associated with the overlap section. In step S1150, the exemplary electronic device 100 would generate the MPOV video from the first media content and the second media content within the highlight period.

In the following, the exemplary electronic device 100 would be further elaborated with specific exemplary embodiments with reference to the method illustrated in FIGS. 10A-10B and FIG. 11. The present embodiment of the disclosure would determine whether each of the media contents is related to the event in time and location according to the steps illustrated in FIGS. 10A and 10B, and the media contents that are identified to be related to the same event in time and location would be identified as the relevant media contents. Then, the exemplary electronic device 100 would provide the media contents identified to be related to the same event as candidate media contents for generating the MPOV video. Furthermore, according to the steps illustrated in FIG. 11, the exemplary electronic device 100 would synchronize the relevant media contents to identify an overlap section where the relevant media contents overlaps in time. Then, a highlight period would be identified within the overlap section so as to generate the MPOV video with highlight of the event.

In the one of the exemplary embodiment of the disclosure, the exemplary electronic device 100 illustrated in FIG. 3 may be any one of the electronic devices 10, 20, 30 illustrated in FIG. 1. In other words, the media contents representing the scenes of the event may be captured from different viewpoints of the event by the image capturing component 170 of each of the electronic devices 10, 20, 30 and stored in the storage medium 150 of each of the electronic devices 10, 20, 30.

With reference to FIG. 1, the first electronic device 10 may be a content requestor initiating a process of generating a MPOV video and requesting media contents, and the second electronic device 20 and/or the third electronic device 30 may be a content provider providing media contents to the electronic device 10 for generating the MPOV video of the event. In the exemplary embodiment, the first electronic device 10 may identify a relevant media content among a plurality of media contents in response to a time code, audio information, and location information including a geographic tag and a surrounding signal information embedded in or associated with a metadata of the media contents. In one of the exemplary embodiment of the disclosure, the first electronic device 10 may group the relevant media content into a media collection. It should be noted that the grouping of the media contents to a media collection (such as a media album) may be performed automatically according to the metadata upon the capture of the media contents or manually by a user such as inserting or removing media contents into the collection, the disclosure is not limited thereto.

Then, the first electronic device 10 may transmit the metadata of the relevant media content as a set of relevance criteria to the second electronic device 20 or the third electronic device 30 for requesting the relevant media content (i.e., a metadata exchange). In the present embodiment, the set of relevance criteria may be a metadata of the relevant media content, which includes the time information, the audio information and the location information. The second electronic device 20 would identify a relevant media content among a plurality of media contents captured by the second electronic device 20 according to the metadata of the relevant media contents transmitted from the first electronic device 10. In other words, the second electronic device 20 would identify the relevant media content among the media content captured by the second electronic device 20 in response to the time information, the audio information, the location information corresponding to the relevant media content captured by the first electronic device 10. Furthermore, the third electronic device 30 would perform similar procedure as the electronic device 20, thus the description regarding the third electronic device would be omitted.

It should be noted that the disclosure is not limited to the metadata exchange described above. In one of the exemplary embodiments, the first electronic device 10 may obtained a set of relevance criteria according to the media contents within the media collection. In yet another exemplary embodiment, the set of relevance criteria may be configured by a user for indicating the interest of the user. For example, the media collection may be created for collecting media contents captured between 5:00 pm to 9:00 pm on May $1^{st}$ at a baseball stadium for a baseball game. Accordingly, a predetermined time period (e.g., 5:00 pm thru 9:00 pm on May 1st) and a predetermined geographic coordinate of a particular location at interest (e.g., the baseball stadium) may be determined according to the media contents with the media collection. The audio information of the set of relevance criteria may be obtained by analyzing the relevance media contents upon the initiation of the generation of the MPOV video. For example, audio information of media contents within the media collection may be extracted as one of the parameters for the set of relevance criteria upon the initiation of the generation of the MPOV video. In addition, the surrounding signal information at the particular location may be obtained from the metadata of the media contents within the media collection or manually configured by a user. The first electronic device 10 would then receive the relevant media content corresponding to the set of relevance criteria from the second electronic device 20 or the third electronic device 30 as candidate media contents for the MPOV video.

Afterward, the first electronic device 10 would synchronize the relevant media contents to identify an overlap section where the relevant media contents captured by the first, second and third electronic devices 10, 20, 30 overlaps in time, and then identify a highlight period based on a content feature of the media contents within the overlap section. The processor 110 would then generate the MPOV video by combining/stitching the relevant media contents within the highlight period.

In summary, the exemplary electronic device of the present disclosure provides would identify a first media content and a second media content relating to a same event in time and location according to time information, audio information, and location information including a geographic tag and a surrounding signal information embedded in or associated with a metadata of each of the media contents. Then, the first media content and the second media content would be provided as relevant media contents for generating the MPOV video of the event. The disclosure would further synchronize the relevant media contents to identify an overlap section where the relevant media contents overlaps in time. From the overlap section, a highlight period of event may be identified according to a content feature of the relevant media contents. Accordingly, a MPOV video may be generated according to the relevant media contents within the highlight period.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

What is claimed is:

1. A method of generating a multiple point of view (MPOV) video, applicable to an electronic device, the method comprising:
   identifying, by a processor, from the plurality of media contents, a first media content and a second media content as relevant media contents of a same event;
   identifying, by the processor, an overlap period which the first media content and the second media content overlap in time;
   identifying a plurality of continuous images captured in a zoom-in shot type or a zoom-out shot type as a target media content of the relevant media contents by analyzing a content feature of the relevant media contents associated with the overlap period;
   identifying, by the processor, a target duration of the target media content as a highlight period within the overlap period, wherein the target duration is less than a duration of the overlap period; and
   generating, by the processor, at least a portion of the MPOV video based on the first media content and the second media content within the highlight period and excluding a remaining time period of the overlap period, wherein the highlight period and the remaining time period are different durations in the overlap period, and the highlight period plus the remaining time period is equal to the whole overlap period,
   wherein a frame of the MPOV video comprises at least two portion, the first media content and the second media content within the highlight period recording a proximal same moment of the same event from different perspective are respectively displayed in the at least two portion of the frame of the MPOV video.

2. The method of claim 1, wherein identifying the highlight period by analyzing the content feature of the relevant media contents associated with the overlap period comprises:
   analyzing the content feature of the first media content and the second media content by determining whether the first media content or the second media content within the overlap period is a still image.

3. The method of claim 1, further comprising:
   analyzing the content feature of the first media content and the second media content by determining a shot type of the first media content and the second media content based on a ratio of an object that occupies a frame of the first media content or the second media content within the overlap period; and
   identifying the highlight period among the overlap period based on the shot type of the first media content or the second media content associated with the overlap period.

4. The method of claim 3, wherein the shot type comprises at least one of a closed-up shot, a zoom-out shot and a zoom-in shot.

5. The method of claim 1, wherein identifying the overlap period which the first media content and the second media overlap in time comprises:
   identifying the overlap period based on a timestamp of each of the first media content and the second media content.

6. The method of claim 5, wherein the timestamp comprises a start time and an end time of the first media content and the second media content.

7. The method of claim 1, wherein the step of identifying the overlap period which the first media content and the second media content overlap in time comprises:
   identifying the overlap period based on audio information of the first media content and the second media content.

8. The method of claim 1, wherein the first media content and the second media content are captured from different points of view of the same event by different electronic devices.

9. The method of claim 1, wherein the first media content and the second media content comprise a still image, video, burst images, and an audio recording.

10. The method of claim 1, further comprises selecting a footage having a predetermined duration from the overlap period among the relevant media contents as the highlight period.

11. An electronic device, comprising:
    a processor, configured for:

identifying, from the plurality of media contents, a first media content and a second media content as relevant media contents of a same event;

identifying an overlap period which the first media content and the second media content overlap in time;

identifying a plurality of continuous images captured in a zoom-in shot type or a zoom-out shot type as a target media content of the relevant media contents by analyzing a content feature of the relevant media contents associated with the overlap period;

identifying a target duration period of the target media content as a highlight period within the overlap period, wherein the target duration is less than a duration of the overlap period; and generating at least a portion of the MPOV video based on the first media content and the second media content within the highlight period and excluding a remaining time period of the overlap period, wherein the highlight period and the remaining time period are different durations in the overlap period, and the highlight period plus the remaining time period is equal to the whole overlap period, wherein a frame of the MPOV video comprises at least two portions, the first media content and the second media content within the highlight period recording a proximal same moment of the same event from different perspective are respectively displayed in the at least two portions of the frame of the MPOV video.

12. The electronic device of claim 11, wherein the processor is further configured for analyzing the content feature of the first media content and the second media content by determining whether the first media content or the second media content within the overlap period is a still image.

13. The electronic device of claim 11, wherein the processor is further configured for analyzing the content feature of the first media content and the second media content by determining a shot type of the first media content and the second media content based on the ratio of an object that occupies a frame of the first media content and the second media content associated with the overlap period, and identifying the highlight period among the overlap period based on the shot type of the first media content or the second media content associated with the overlap period.

14. The electronic device of claim 13, wherein the shot type comprises at least one of a closed-up shot, a zoom-out shot and a zoom-in shot.

15. The electronic device of claim 11, wherein the processor is further configured for identifying the overlap period based on a timestamp of each of the first media content and the second media content.

16. The method of claim 15, wherein the timestamp comprises a start time and an end time of the first media content and the second media content.

17. The electronic device of claim 11, wherein the processor is further configured for identifying the overlap period based on audio information of the first media content and the second media content.

18. The electronic device of claim 11, wherein the first media content and the second media content are captured from different points of view of the same event by different electronic devices.

19. The electronic device of claim 11, wherein the first media content and the second media content comprises a still image, a video, burst images and an audio recording.

20. The electronic device of claim 11, wherein the processor is further configured for selecting a footage having a predetermined duration from the overlap period among the relevant media contents as the highlight period.

* * * * *